United States Patent
Phan Le

(10) Patent No.: US 9,001,041 B2
(45) Date of Patent: Apr. 7, 2015

(54) DETECTION SYSTEM AND METHOD FOR DETECTING MOVEMENTS OF A MOVABLE OBJECT

(75) Inventor: Kim Phan Le, Eindhoven (NL)

(73) Assignee: NXP, B.V., Eindhoven (NL)

(*) Notice: Subject to any disclaimer, the term of this patent is extended or adjusted under 35 U.S.C. 154(b) by 508 days.

(21) Appl. No.: 13/165,597

(22) Filed: Jun. 21, 2011

(65) Prior Publication Data

US 2012/0001860 A1    Jan. 5, 2012

(30) Foreign Application Priority Data

Jul. 5, 2010 (EP) .................................. 10168405

(51) Int. Cl.
| G06F 3/033 | (2013.01) |
| G06F 3/0338 | (2013.01) |
| G06F 3/03 | (2006.01) |
| G06F 3/038 | (2013.01) |

(52) U.S. Cl.
CPC ............ *G06F 3/0338* (2013.01); *G06F 3/0304* (2013.01); *G06F 3/038* (2013.01)

(58) Field of Classification Search
CPC .................. G06F 3/0338; G05G 2009/04759; G05G 9/047
USPC ........................ 345/161, 173; 463/38; 700/85; 348/211.7; 361/679.1, 679.18; 200/179, 8 R, 4, 5 R, 6 A, 17 R, 18; 74/471 XY; 250/208.6; 341/20
See application file for complete search history.

(56) References Cited

U.S. PATENT DOCUMENTS

| 5,694,153 A * | 12/1997 | Aoyagi et al. ................. 345/161 |
| 5,696,535 A * | 12/1997 | Rutledge et al. .............. 345/156 |
| 5,749,577 A * | 5/1998 | Couch et al. .............. 273/148 B |
| 5,912,659 A * | 6/1999 | Rutledge et al. .............. 345/156 |
| 5,943,233 A * | 8/1999 | Ebina et al. ..................... 700/85 |
| 6,232,959 B1 * | 5/2001 | Pedersen ........................ 345/161 |
| 6,300,940 B1 * | 10/2001 | Ebina et al. .................... 345/161 |
| 6,326,948 B1 * | 12/2001 | Kobachi et al. ............... 345/157 |
| 6,975,302 B1 * | 12/2005 | Ausbeck, Jr. ................. 345/161 |
| 8,558,162 B2 | 10/2013 | Phan Le |
| 2001/0007449 A1 * | 7/2001 | Kobachi et al. ............... 345/156 |
| 2008/0030466 A1 | 2/2008 | Keates et al. |
| 2009/0073119 A1 * | 3/2009 | Phan Le et al. ............... 345/161 |
| 2009/0231165 A1 * | 9/2009 | Phan Le .......................... 341/20 |
| 2011/0168874 A1 * | 7/2011 | Phan Le ..................... 250/208.6 |
| 2012/0032881 A1 | 2/2012 | Le Phan |

FOREIGN PATENT DOCUMENTS

| WO | 2005085987 A1 | 9/2005 |
| WO | WO 2010035170 A1 * | 4/2010 |

OTHER PUBLICATIONS

Weisstein, "Norm" from MathWorld—A Wolfram Web resource http://mathworld.wolfram.com/Norm.html downloaded Oct. 11, 2013.*

(Continued)

*Primary Examiner* — Dorothy Harris

(57) ABSTRACT

The present invention concerns a detection system and a corresponding method for detecting movements of a movable object that compensate for unintentional tilt movement of the movable object in a first direction and/or in a second direction when a linear movement in a third direction is detected.

13 Claims, 5 Drawing Sheets

(56) References Cited

OTHER PUBLICATIONS

Eberly, Derivative Approximation by Finite Differences, Geometric Tools, LLC, created : May 30, 2001, last modified: Mar. 2, 2008 downloaded from http://www.geometrictools.com/Documentation/FiniteDifferences.pdf Oct. 12, 2013.*

Unit circle and unit vector downloaded Sep. 16, 2014 from http://mathforum.org/~klotz/Vectors/unitVandC.html.*

Trewin, Shari et al.; "Developing Steady Clicks: A Method of Cursor Assistance for People with Motor Impairments"; ASSETS' 06, Oct. 22-25, 2006; Portland OR, US; http://delivery.acm.org/10.1145/1170000/1168993/p26-trewin.pdf?key1=1168993&key2=4170818821&coll=GUIDE&CFID=107490315&CFTOEKN=29601002; pp. 26-33; retrieved on Oct. 27, 2010.

Extended European Search Report, 10168405.8, Oct. 27, 2010.

* cited by examiner

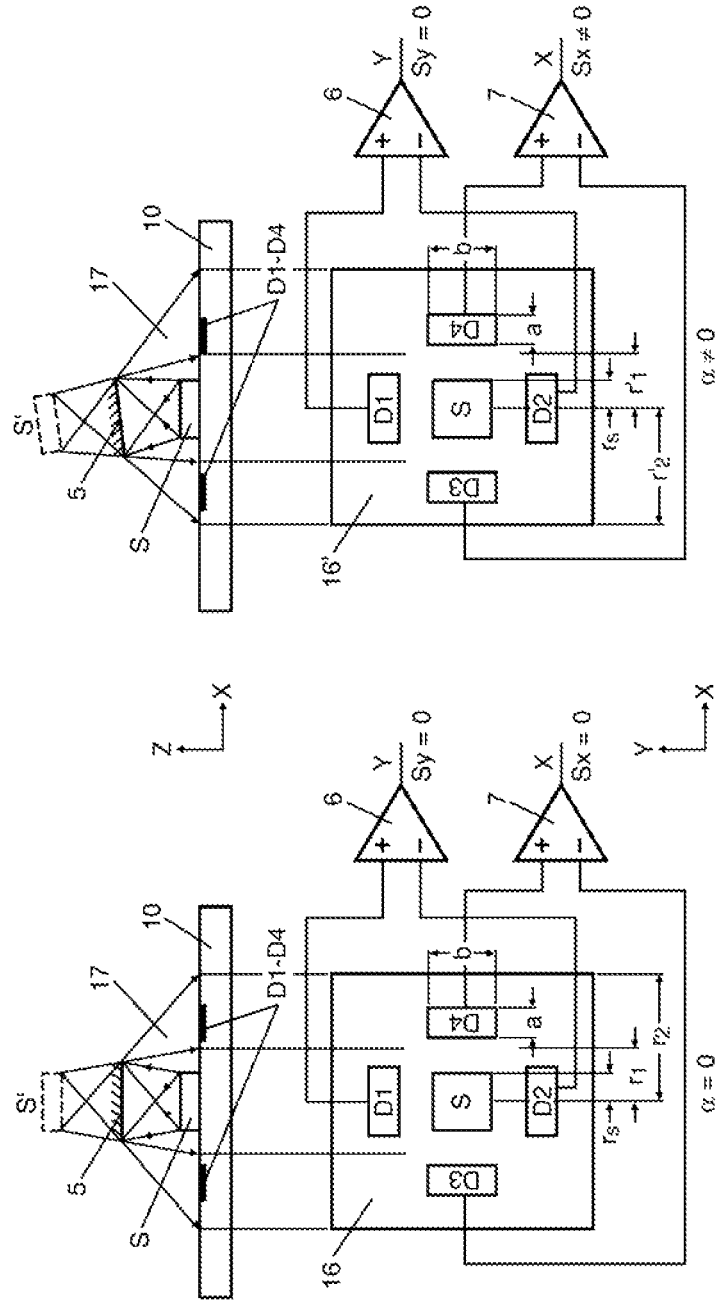

DETECTION SYSTEM AND METHOD FOR DETECTING MOVEMENTS OF A MOVABLE OBJECT

This application claims the priority under 35 U.S.C. §119 of European patent application no. 10168405.8, filed on Jul. 5, 2010, the contents of which are incorporated by reference herein.

FIELD OF THE INVENTION

The invention relates to a detection system for the detection of movements of a movable object. The invention also relates to a method for detecting movements of a movable object of a detection system. The invention further relates to an integrated circuit having implemented therein a detection system for detecting the movements of a movable object. Finally, the invention relates to a portable device comprising a detection system for the detection of movements of a movable object.

BACKGROUND OF THE INVENTION

In recent years the market for mobile devices such as mobile phones, PDAs, has grown enormously. The diversity in functionalities and user interfaces has also increased.

Existing mobile devices usually have a display (for example a Liquid Crystal Display) including a cursor which is to be controlled. The control of the cursor on the display is often performed by a 5-way joystick, which contains five switches located under the dome of a knob which can be operated by the user for performing any desired movement of the cursor. By pressing the joystick up or down or to the left or right, one of the four switches is closed, and this causes a corresponding movement of the cursor on the display in steps to a desired direction or position. With this kind of joystick and the use of four of the five switches only control of the cursor in four directions is possible. The fifth switch is usually provided as a central switch and is used for the "click" function, which means that the user can operate a corresponding button associated to the fifth switch to select a certain item on a menu by clicking the knob of the joystick vertically to thereby close the fifth switch.

PDAs and mobile phones nowadays have increasingly larger displays, and the control menus of such devices become more and more complex. Some specific functions such as gaming, web browsing, navigation, etc. may need a more precise and, thus, a continuous control of the cursor rather than a stepped control. The use of touch-screens in smart-phones has been growing enourmously in the past few years. The touch-screen is undoubtedly very handy, intuitive, and user-friendly in many cases. Still, in some cases, such as web-browsing, gaming, and navigation, touch-screens clearly show drawbacks as small items cannot be precisely selected on a web page, or the user's finger covers a part of the screen during gaming or a part of a map in a navigation application. Moreover, the mobile devices in question must be compact, robust, must have low power consumption and also a low price. With a joystick of continuous control (also referred to as an analog joystick) for such a mobile device it should be possible to perform many complicated tasks in the same way as a computer mouse can do, including the press-to-select function (that is, the "click" function), which means that a certain item in the menu can be selected by simply pressing the knob vertically. The analog joystick is seen as a complementary input device to the touch-screen in modern mobile phones and PDAs.

WO 2010/035170 A1 discloses a detection system for the detection of movements of a movable object, said system comprising a light emitting device for emitting light, a reflecting unit being arranged in functional connection with said movable object and being adapted for reflecting said emitted light, a plurality of detectors for detecting said reflected light and outputting detection signals for determining a movement of said movable object, wherein said plurality of detectors includes a first subset of detectors for the detection of a tilt movement of said movable object in a first direction, and a second subset of detectors for the detection of a tilt movement of said movable object in a second direction, and the detection of the tilt movement of said movable object is performed based on a difference in the irradiance of the reflected light on the detectors within each subset of detectors, and wherein said movement of said movable object includes a linear movement in a third direction perpendicular to said first and said second directions and said linear movement of said movable object in said third direction is detected based on the output signals of at least one of the first and the second subsets of detectors. WO 2010/035170 A1 further discloses a corresponding method for detecting movements of a movable object of a detection system. The detection system according to WO 2010/035170 A1, also known as an optical joystick, is able to provide said continuous control of the cursor.

However, the detection system of WO 2010/035170 A1 suffers from the so-called slip-away problem. The slip-away problem means that a target item on a display, i.e. the item that the user wishes to select, is missed just when a click signal is generated. This problem is very annoying for the user.

SUMMARY OF THE INVENTION

It is an object of the invention to provide a detection system and a method for detecting movements of the kind set forth, which do not suffer from the slip-away problem. This object is achieved by the detection system according to claim 1 and the method according to claim 11.

The inventor has recognized that the slip-away problem is caused by the following behavior of the system. The movable object, i.e. a knob which is hung by a spring, serves both tilt and click operations. In other words, the knob is used to determine movements in the X and Y directions, which are used, for example, to steer the movement of a cursor on a display, but also for movements in the Z direction, which are used to select a target item on the display to which the cursor has moved by performing a click operation. An ideal click operation is performed only if the click force is perfectly applied to the center of the knob and in a perfectly vertical direction. However, in practice the click force is either not perfectly vertical and/or not exactly applied at the center point of the knob. This results in a lateral force component applied to the knob during a click action, which produces a torque on the rotation point of the spring that slightly tilts the reflecting unit, besides moving it downward. As a consequence, the differential signal in the X and/or Y direction(s) becomes non-zero and shortly after that returns to zero again when the reflecting unit is in the fully clicked down position. In other words, unintentional tilt movement is detected in the X and/or Y direction(s), which results in the slip-away problem. The slip-away problem is annoying for the user because the target item on the display is missed just when the click signal, based on movement in the Z direction, is generated. This is an inherent property of the spring; therefore it is not possible to solve the problem by mechanical design. The basic concept of the invention is therefore that the detection system and the corresponding method for detecting movements of the knob compensate for unintentional tilt movement of the knob in the X and/or Y direction(s) when a linear movement in the third direction (Z) is detected.

According to an aspect of the invention, the system is arranged to compensate for the unintentional tilt movement of said movable object by determining a norm of a differential signal vector, said differential signal vector being formed by the detected tilt movement of said movable object in the first direction and the detected tilt movement of said movable object in the second direction; calculating a derivative of said norm with respect to time; comparing said derivative with a predetermined threshold; and if said derivative exceeds the predetermined threshold, forcing said norm to zero, and if said derivative is equal to or lower than the predetermined threshold, leaving said norm unchanged.

According to another aspect of the invention, said norm is determined iteratively, and said derivative is defined as the norm of the differential signal vector at iteration i minus the norm of the differential signal vector at iteration i−n, i and n being integer numbers and i≥n, and the duration of the iterations being constant.

According to yet another aspect of the invention, a portable device includes a display and a detection system, and said portable device is arranged such that the detection system determines a cursor position on said display in dependence of the detected tilt movement of said movable object in the first direction and the detected tilt movement of said movable object in the second direction, and values of the cursor position are stored when the detected tilt movement of said movable object in the first direction and the detected tilt movement of said movable object in the second direction has ended, and the unintentional tilt movement of said movable object is compensated by restoring the cursor position to the stored values when a linear movement in the third direction is detected.

According to a further aspect of the invention, said detection signals of said plurality of detectors are communicated to a plurality of processing units for obtaining signals indicative of the movement of said movable object based on said variation of said irradiance on said plurality of detectors.

According to yet a further aspect of the invention, said processing units include differential circuits for detecting differences in said output signals of said plurality of detectors and said processing units are adapted for outputting a differential signal indicative of said movement of the movable object.

According to yet a further aspect of the invention, said light emitting device and said plurality of detectors are integrated on a substrate.

According to yet a further aspect of the invention, said light emitting device is located at a center position between said plural detectors and said plural detectors are located symmetrically around said light emitting device.

BRIEF DESCRIPTION OF THE DRAWINGS

The invention will be described in detail with reference to the accompanying drawings, in which:

FIGS. 3a and 3b show cross-sectional view (top drawings) and top view (bottom drawings) of the known detection system when the movable object is at the rest position, wherein the tilt angle is α=0 (FIG. 3a), and when the tilt angle is a few degrees (FIG. 3b)

DETAILED DESCRIPTION OF EMBODIMENTS

Figure 1:
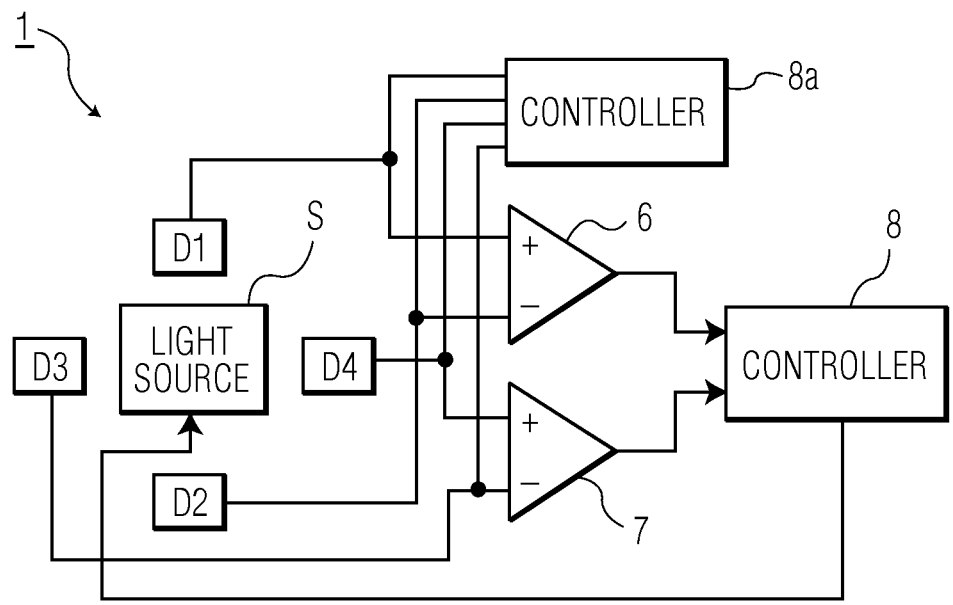
FIG. 1 shows an overall block representation of the circuitry of a known detection system.

FIG. 1 shows an overall configuration of the circuitry of an optical joystick (detection system) which is known from WO 2010/035170 A1.

According to FIG. 1, a plurality of photosensitive devices such as light detectors (or photodetectors) hereinafter referred to as detectors D1 to D4 and having the function (sensing function) of a light receiving means is provided according to a predetermined arrangement. The arrangement of FIG. 1 shows, for example, the detectors D1 to D4, but the arrangement is not limited to this number of detectors since any suitable number n of detectors D1 to Dn can be provided. Each of the detectors D1 to D4 may be composed of a plurality of particular light sensitive elements, such as photo diodes or photo transistors. A light emitting element or light emitting means, hereinafter referred to as a light source S, is provided adjacent to the plural detectors D1 to D4, and is arranged for emitting a light which can be reflected by a reflecting unit 5 (not shown in FIG. 1, explained hereinafter) to obtain incident light on each of the plurality of detectors D1 to D4 by means of the reflecting unit 5. The light source S may be composed of a plurality of particular light emitting elements, such as LEDs.

A subset of the plurality of detectors D1 to D4, in the present case the first and second detectors D1 and D2 are connected to a first processing unit 6, arranged for a pre-processing of corresponding output signals generated by the respective first and second detectors D1 and D2.

In a similar manner a further subset of the plurality of detectors D1 to D4, and specifically the third and fourth detectors D3 and D4 are connected to a second processing unit 7 for providing a corresponding pre-processing of output signals of the respective subset of detectors (the detectors D3 and D4), as in the case of the first processing unit 6.

The pre-processed output signals of the plurality of detectors D1 to D4, and specifically the output signals of the first and second processing units 6 and 7 are communicated to a controller 8 having the function of a data evaluation and control means. The controller 8 is adapted for performing on the one hand the data evaluation on the basis of the pre-processed output signals of the plurality of detectors D1 to D4, and on the other hand to perform a control of the entire detection system. This includes the controlled driving of the light source S for emitting corresponding light.

The output signals of the plurality of detectors D1 to D4 are in addition communicated to a further controller 8a also having the function of a data evaluation and control means. The further controller 8a is adapted for performing the data evaluation on the basis of the output signals of the plurality of detectors D1 to D4. Specifically, based on the supply of the output signal of each of the plurality of detectors, a common signal is produced (by taking the sum of all signals), and a click signal (Z detection signal) is generated and then fed to the (central) controller 8.

The controller 8 may have a connection to any further device and corresponding control means thereof depending upon the device or apparatus to which the detection system is connected or which the detection system is applied to. According to the examples described in this specification the detection system is implemented as a joystick preferably of any movable device. It is in the following referred to as the joystick 1, provided in the form of an optical joystick or a part of any other pointing device for controlling a cursor on a display of portable devices.

FIG. 1 shows the circuit structure as general connections for transmitting and/or receiving data, as well as current and/or voltage signals between the various components of the circuitry shown.

Figure 2:
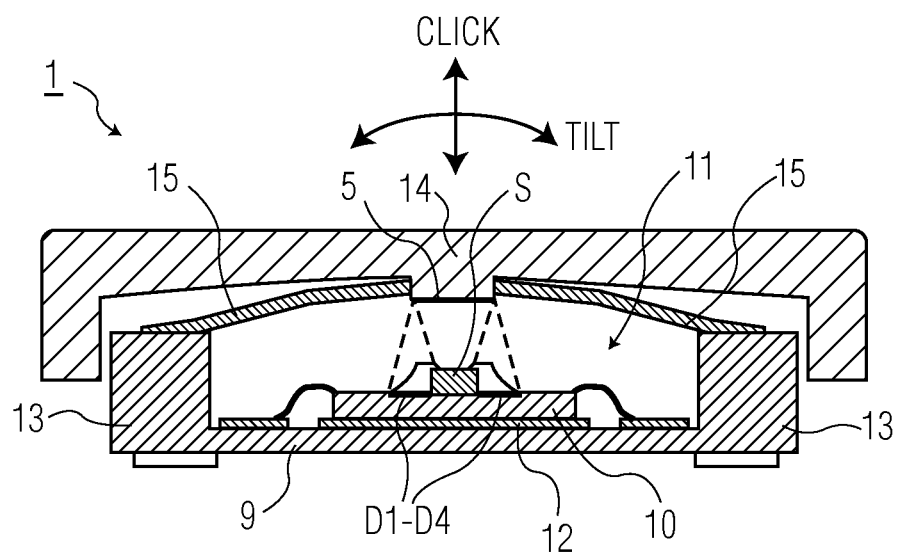
FIG. 2 shows a cross-sectional view of the arrangement of the known detection system.

While FIG. 1 shows the basic elements or components of the circuitry and hardware of the joystick, FIG. 2 shows the cross-sectional view of the arrangement of the joystick disclosed in WO 2010/035170 A1.

The cross-sectional view of FIG. 2 depicts a package (or casing) 9, wherein on a substrate 10 arranged in a cavity 11 of the package 9, the plurality of detectors (photosensitive elements, light receiving elements) D1 to D4 is arranged or embedded. The substrate is fixed to the package 9, preferably in the central portion in the cavity 11 thereof by means of a metal layer 12.

The light source S schematically shown in FIG. 1, is arranged on the substrate 10 preferably but not necessarily at a central portion thereof as a separate component, or may be embedded in the substrate 10, to emit light basically in a direction upward in FIG. 2. While the light source S is preferably located at the central portion of the substrate 10 the plurality of detectors D1 to D4 is arranged around the light source S. The electrical connections between the package and the detectors D1 to D4 and the light source S are provided by bonding wires, and the electrical connections of the package to the outside can be ball-grid; SMD (surface mounted devices), etc., but also flexible connections are possible. The cavity 11 of the package extends above the light source S and the detectors D1 to D4 surrounded by sidewalls 13 of the package 9.

Hence, the substrate 10 in conjunction with the detectors D1 to D4, the light source S and the corresponding bonded connections is commonly housed inside the package, which may be provided in the form of an IC package. In this case the detection system is implemented in the IC package.

Alternatively, the substrate may be molded inside a transparent material which can also serve as an IC package while still light can go through the transparent material.

Above the light source S there is a touch surface on a movable object preferably provided in the form of a knob 14, which can be touched for operation of the joystick by the user. The knob 14 as shown in FIG. 2 basically constitutes a cover over the package 9 and the cavity 11 thereof, and may be movable to a certain extent relative to the package 9. To this end, the knob 14 is flexibly supported by a flexible and elastic suspension mechanism which is preferably provided in the form of a spring 15 which allows the knob 14 to tilt a few degrees around a virtual point when the force from a user's finger is applied. Due to the elastic support of the knob 14 on the package 9 by the spring 15 the knob can return to the central position or rest position when the force of the user's finger is removed, this corresponding to a released position of the knob 14 (movable object).

At the lower portion of the knob 14, basically on the surface thereof opposite to the cavity 11 of the package 9 a reflecting unit 5 is arranged in such a manner as to face the light source S. The reflecting unit 5 is therefore in a functional relationship or operational connection with the knob (movable object) 14 and may be provided in the form of a mirror which can have a symmetrical shape such as a square shape or a circular shape, and the reflecting unit 5 may be mounted basically at the central portion of the knob 14 which may be provided in the form of a protruding portion extending in a direction downward in FIG. 2 towards the substrate 10, and in particular towards the light source S. Hence, for obtaining the functional or operational connection to the knob 14 the reflecting unit 5 is mounted to the bottom of the knob 14, that is, the lower surface of the knob 14, whereas the upper surface of the knob 14 constitutes the touch surface for any operation by the user.

The spring 15 may be fabricated from metal or plastic material to provide the basically symmetrical suspension of the knob 14. Preferably, the spring 15 is fixed to the knob 14 close to the central portion thereof, that is, adjacent to the protruding portion for fixing the reflecting unit 5, while the other ends of the spring 15 are supported by the sidewalls 13 of the package.

The dimensions of the complete device are about a few millimeters, but can be larger if required.

It is to be noted that the shape and the construction of the spring 15, the shape and dimensions of the package 9 and the arrangement of the knob 14 are shown in FIG. 2 just as explanatory examples, and these components may be arranged or designed in a different suitable manner provided that a proper interaction with the further components of the joystick 1 is ensured. The plural detectors D1 to D4, the light source S and further components may be arranged in an integrated manner on the substrate 10 of the package 9, so that an on-chip solution can be obtained.

According to WO 2010/035170 A1, there may be four detectors (photosensitive elements) D1 to D4 of any shape positioned symmetrically around the light source S. A corresponding arrangement is shown in FIG. 3A and 3B, and the operation of the joystick 1 is now described in conjunction with the schematical view (cross-sectional view and plan view) of FIGS. 3a and 3b.

Moreover, the knob 14 may be made of an elastic material having a certain compliance when pressed by the user's finger, or may be made of a rigid material.

The spring 15 for flexibly and movably supporting the knob 14 is arranged in such a manner that the knob 14 stands upright in a rest position (upper drawing in FIG. 3a) when no force is applied to the knob 14, that is, when the user no longer touches the knob 14 but has released the knob 14. When the knob 14 stands upright in the rest position the reflecting unit 5, which may be provided in the form of a mirror or any metalized plane, stands basically parallel to the substrate 10, and due to the reflecting unit's position facing the light source S, light emitted from the light source S is reflected by the reflecting unit 5 and causes a light spot 16 onto the substrate 10, and in particular on the plurality of detectors D1 to D4. This light spot 16 constitutes a predetermined area on the substrate 10 which is illuminated and which basically covers the plural detectors D1 to D4.

From the upper drawings of FIGS. 3a and 3b, it can be considered that the image S' of the light source S behind the reflecting unit 5 shines a light cone 17 through an opening created by the outline (size) of the reflecting unit 5. The light spot 16 can have an outline shape of a square, a circle or a square with rounded corners, depending upon the shapes of the light source S and of the reflecting unit 5. Due to the preferred symmetry of the complete system of the joystick 1 the reflected light spot 16 is centered on the detector configuration (detectors D1 to D4). In other words, all detectors D1 to D4 in the case of FIG. 3a basically receive an equal amount of light (the tilt angle of the knob $\alpha$=0) and the output signals of the respective detectors D1 to D4 are almost the same. Hence, reflected light of the light source S is almost continuously incident on the detectors D1 to D4 thereby acting as a constant background signal at all the plural detectors D1 to D4.

Since the detectors D1 to D4, as is shown in FIG. 1, are respectively connected to a first and a second processing units 6 and 7, which may be provided preferably in the form of two differential circuits (differential amplifiers), these first and second processing units 6 and 7 are arranged to generate output signals X and Y which correspond to the tilt of the knob 14 in the X and Y directions.

Hence, since according to the arrangement shown in FIG. 3a and the corresponding position of the light spot 16 on the plurality of detectors D1 to D4 a basically equal output signal of all of the plurality of detectors D1 to D4 is obtained, the output signals in X and Y directions provided after pre-processing by the first and the second processing units 6 and 7 are zero. This indicates the rest position or untilted position of the knob 14 and the specific situation that no force is applied to the knob 14 and no operation is intended by the user.

Different shapes of the light source S and the reflecting unit 5 can be used and different shapes of the light spot 16 and the outline thereof may occur.

While in FIG. 3a the knob 14 has not been touched by the user so that the tilt angle $\alpha=0$, the tilt angle $\alpha$ of the knob 14 as shown in FIG. 3b is not identical to zero ($\alpha \neq 0$), and this indicates that the joystick 1 is at least slightly tilted anticlockwise around a virtual pivot in the middle of the reflecting unit 5. The image S' of the light source S is moved along a circle to a new position arranged on the left hand side relative to the untilted position shown in FIG. 3a. The light cone 17 which is incident on the plurality of detectors D1 to D4 is therefore also tilted and consequently the light spot 16 is slightly displaced to the right (in the bottom drawing of FIG. 3b) and the light irradiance profile is no longer symmetric on the plurality of detectors D1 to D4. Since the symmetry of incident light on the plurality of detectors D1 to D4 is broken due to the tilted knob and, thus, the tilted reflecting unit 5, for example, the fourth detector D4 receives more light than the third detector D3, while the first and second detectors D1 and D2 still receive basically an equal amount of light.

Hence, when the output signals of the respective detectors D1 to D4 are fed to the corresponding first and second processing units 6 and 7 and are pre-processed preferably based on differential circuits, on the output X (second processing unit 7) a non-zero signal is detected which is proportional to the tilt angle of the reflecting unit 5 in the X-direction. Furthermore, the signal on the output Y of the first processing unit 6 remains zero due to the basically equal amount of light incident on this subset of detectors (first and second detectors D1 and D2).

Similarly, a tilt in any direction (X and Y directions) can be detected by performing a processing and data evaluation on the output signals of the plurality of detectors D1 to D4.

It is to be noted that the way of connecting the plurality of detectors D1 to D4 as shown in FIGS. 1 and 3 is merely an example, and there may be different ways to connect the detectors with plural processing units (such as the processing units 6 and 7) to extract the signals X and Y from the plurality of detectors, and in particular from the four detectors D1 to D4 according to the examples shown in FIGS. 1 and 3.

The range of the tilt angle of the knob 14 and of the reflecting unit 5 fixed thereto is limited by the knob 14 touching one of the sidewalls 13 of the package 9 when tilted to the left side or right side in FIGS. 2 and 3. In FIG. 2 in the upper portion thereof arrows are shown to indicate the possibility of operating the knob 14 by the user. That is, the arc-shaped arrow with the inscription "tilt" indicates the tilting angle which can be applied on the knob 14 and which has a certain operation range.

According to WO 2010/035170 A1, the knob 14 is also used for recognizing click-to-select actions by a user. For this purpose the movement of the knob 14 includes a linear movement in a third direction Z which is substantially perpendicular to the first direction Y and the second direction X. The linear movement of the knob 14 in the third direction Z is detected based on the output signals of at least one of the first and the second subsets of detectors.

The detection in the third direction Z is used when the user operating the joystick 1 wants to select a certain target item on the display after the cursor has been suitably positioned by means of the joystick 1 according to the above-described detection in the first direction Y and the second direction X. That is, in order to select a certain target item on the display it is necessary to move the cursor (by tilting the knob 14) to a desired location on the display, to release the knob 14 (so that the cursor stops moving and the knob 14 is no longer tilted), and to press the knob 14 vertically (downwards in the cross-sectional view of FIG. 2).

The elastical members in the form of spring 15 are designed in such a way that it has two stable positions: the click position (lower position) and the released position (higher position). On top of that, the knob 14 in conjunction with the spring 15 can still be tilted for detecting movement in the Y and X directions.

The click function is based on the phenomenon that when the reflecting unit 5 (when exerting a vertical force on the knob 14) travels closer to the substrate 10 (containing the plurality of detectors D1 to D4), the light path (length) becomes shorter so that the irradiance at any point on the substrate 10 being inversely proportional to the light path, is increased.

The increase in the irradiance (the power of light radiation on a surface) is the same for all of the plurality of detectors D1 to D4, and accordingly the click action in the Z direction can be detected by using the signals (representing the sum of all signals) from all the plurality of detectors D1 to D4 or alternatively from a subset thereof However, during this action the differential signal should remain unchanged.

Figure 4A:
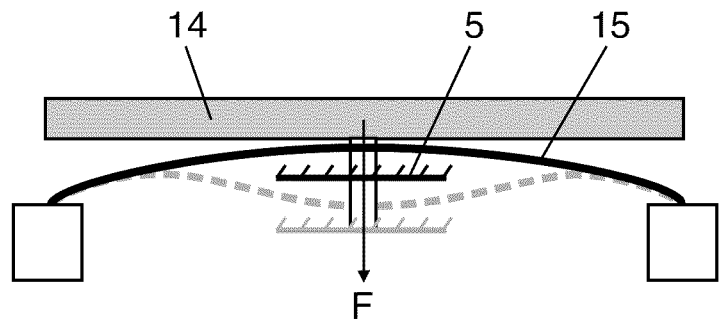
FIGS. 4a and 4b illustrate the problem solved by the present invention.
Figure 4B:
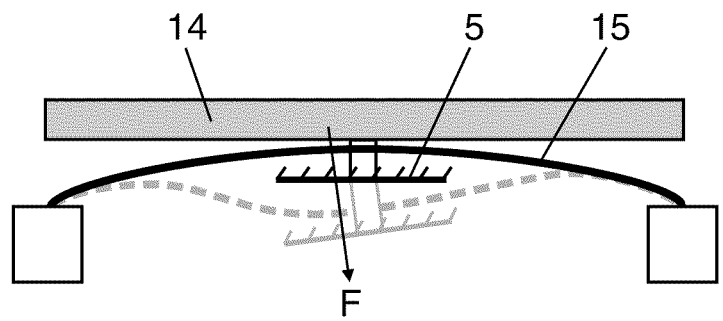

FIGS. 4a and 4b illustrate the problem solved by the present invention. The knob 14, which is hung by the spring 15, serves both tilt and click operations. In other words, the knob 14 is used to determine movements in the X and Y directions, which are used, for example, to steer the movement of a cursor on a display, but also for movements in the Z direction, which are used to select a target item on the display to which the cursor has moved by performing a click operation. An ideal click operation is performed only if the click force F is perfectly applied to the center of the knob 14 and in a perfectly vertical direction, as shown in FIG. 4a. However, in practice the click force is either not perfectly vertical and/or not exactly applied at the center point of the knob 14, as shown in FIG. 4b. This results in a lateral force component applied to the knob 14 during a click action, which produces a torque on the rotation point of the spring 15 that slightly tilts the reflecting unit 5, besides moving it downward. The reflecting unit 5 may for example be a mirror. As a consequence, the differential signal in the X and/or Y direction(s) becomes non-zero and shortly after that returns to zero again when the reflecting unit 5 is in the fully clicked down position. In other words, unintentional tilt movement is detected in the X and/or Y direction(s), which results in the so-called slip-away problem. The slip-away problem is annoying for the user because the target item on the display is missed just when the click signal, based on movement in the Z direction, is generated. This is an inherent property of the spring 15; therefore it is not possible to solve the problem by mechanical design.

Figure 5:
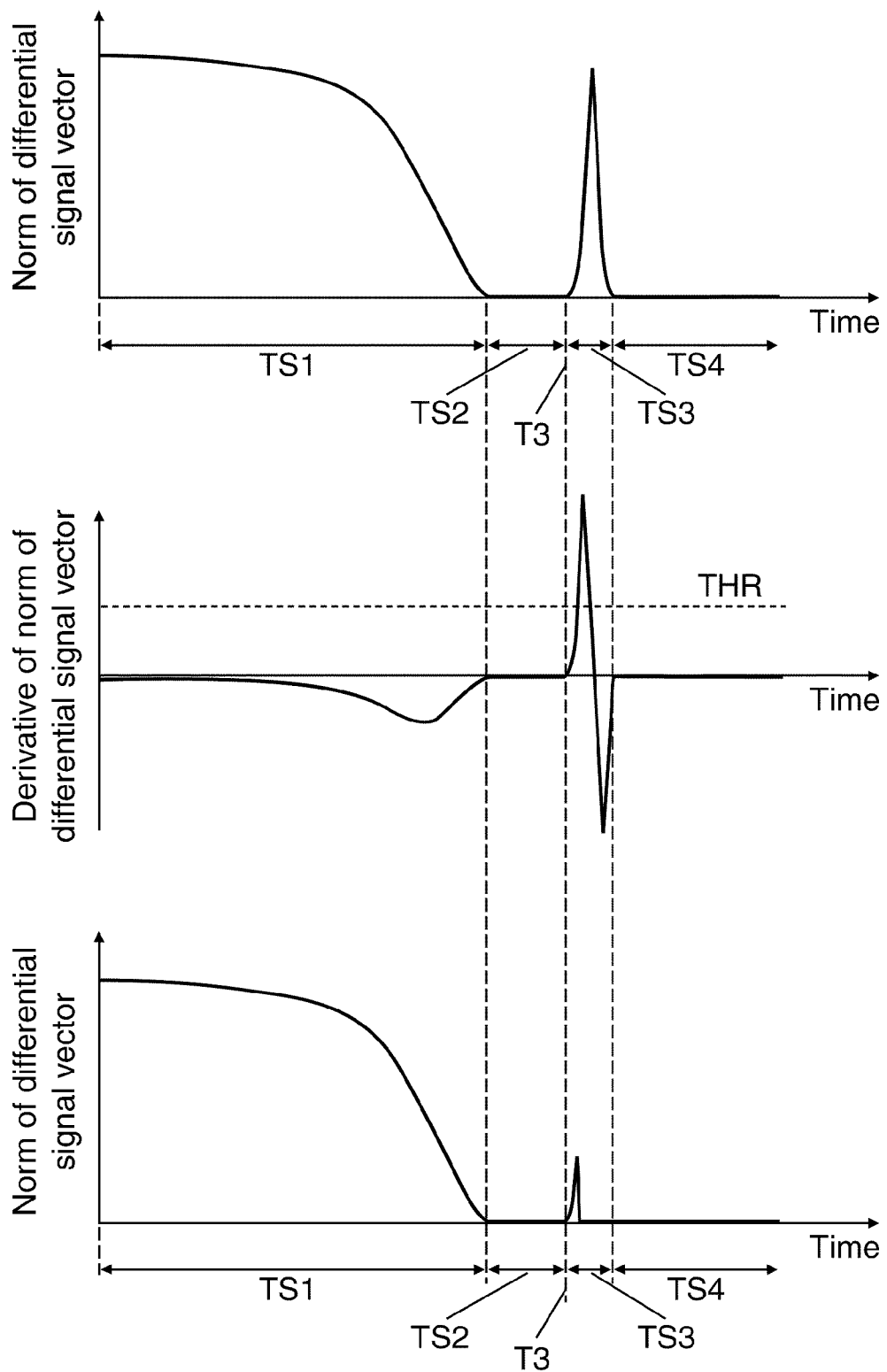
FIG. 5 illustrates a first embodiment of the present invention.

FIG. 5 illustrates a first embodiment of the present invention. According to the basic concept of the invention, the detection system which detects movement of the knob 14 is arranged to compensate for an unintentional tilt movement of the knob 14 in the Y direction and/or in the X direction at the moment that a linear movement in the Z direction is detected.

According to the first embodiment of the invention this concept is implemented as follows. In a normal mode of operation, changes in the norm of the differential signal vector (which is formed by X and Y signal components) are moderate, meaning that its derivative with respect to time is normally not too large. However, when a click action is started (FIG. 5, upper drawing), the norm of the differential signal vector usually rises suddenly due to the large pressing force and the non-ideal application of the force, which results in a relatively high derivative of the norm (FIG. 5, center drawing).

For example, in a first time slot TS1 the cursor is being moved to a target item on the display. At the end of the first time slot TS1 the cursor is stopped to prepare for a click operation. In a second time slot TS2 there is no movement of the cursor. At time instant T3 the click operation starts, which causes the norm of the differential signal vector to peak in a relatively short time slot TS3. The derivative of the norm reaches relatively high and low values in time slot TS3 (FIG. 5, center drawing). Thus, in time slot TS3 the cursor slips away. In time slot TS4 the click operation has completed and the norm of the differential signal vector and its derivative are zero. According to the first embodiment of the invention, the norm of the differential signal vector is forced to zero if the derivative is larger than a predetermined threshold THR. The effect of forcing the norm of the differential signal vector to zero is that the cursor is frozen, thereby avoiding that the cursor slips away. A suitable value for the threshold THR can be found by experiments.

The lower drawing of FIG. 5 shows the effect of forcing the norm of the differential signal vector to zero. At the moment the derivative becomes larger than the threshold THR (FIG. 5, center drawing) the norm of the differential signal vector is set to zero and remains zero at least until the click action has completed (FIG. 5, lower drawing). Thus, movement in the first direction Y and the second direction X is effectively suppressed, and as a result the cursor is frozen.

Figure 6:
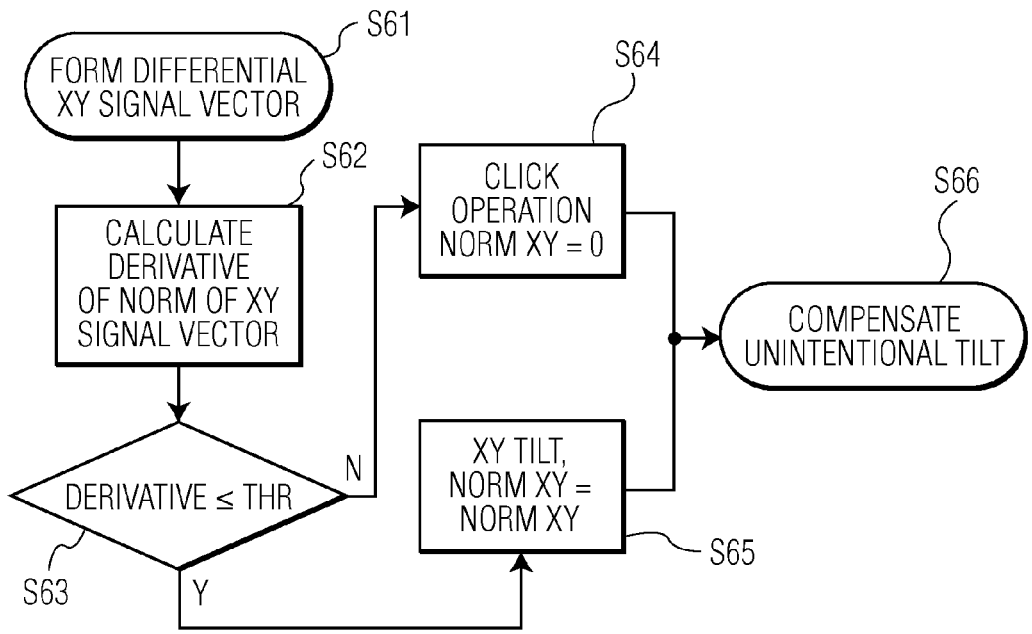
FIG. 6 shows an exemplary algorithm which describes the functioning of the first embodiment.

FIG. 6 shows an exemplary algorithm which describes the functioning of the first embodiment. The algorithm can be implemented in software or in a digital circuitry of a processing unit. In a first step S61, a differential signal vector is formed by the detected tilt movement of the knob 14 in a first direction (Y direction) and the detected tilt movement of the knob 14 in a second direction (X direction). Starting from the norm of the differential signal vector XY in the polar coordinate system, the derivative of this norm with respect to time is calculated in a second step S62. In practice the system is operated in an iterative way, and during each iteration signals are sampled and processed. The derivative of the norm can therefore be defined as the norm of the differential signal vector at iteration i minus the norm of the differential signal vector at iteration i−n, wherein i and n are integer numbers, i≥n and the duration of the iterations is substantially constant. The skilled person will appreciate that there are alternative ways to calculate a derivative of the kind set forth.

In the next step S63, the derivative is compared to a threshold THR. If the derivative is equal to or lower than the threshold THR, then the assumption is that the joystick is operated in the normal XY tilt mode, in which the user wishes to move the cursor around on the display. When this condition is met, the output signal is set to the input signal in step S65 and the new cursor position on the display is calculated using the differential signal vector in step S66. Basically, if the derivative is equal to or lower than the threshold THR, then the norm of the differential signal vector will be left unchanged. However, if the derivative exceeds the threshold THR, then the assumption is that a click operation is started. In that case the norm of the differential signal vector is set to zero in step S64. As a result the cursor position will not change. Thus, in step S66 the cursor is effectively frozen, thereby compensating for any unintentional tilt movement of the knob 14.

Figure 7:
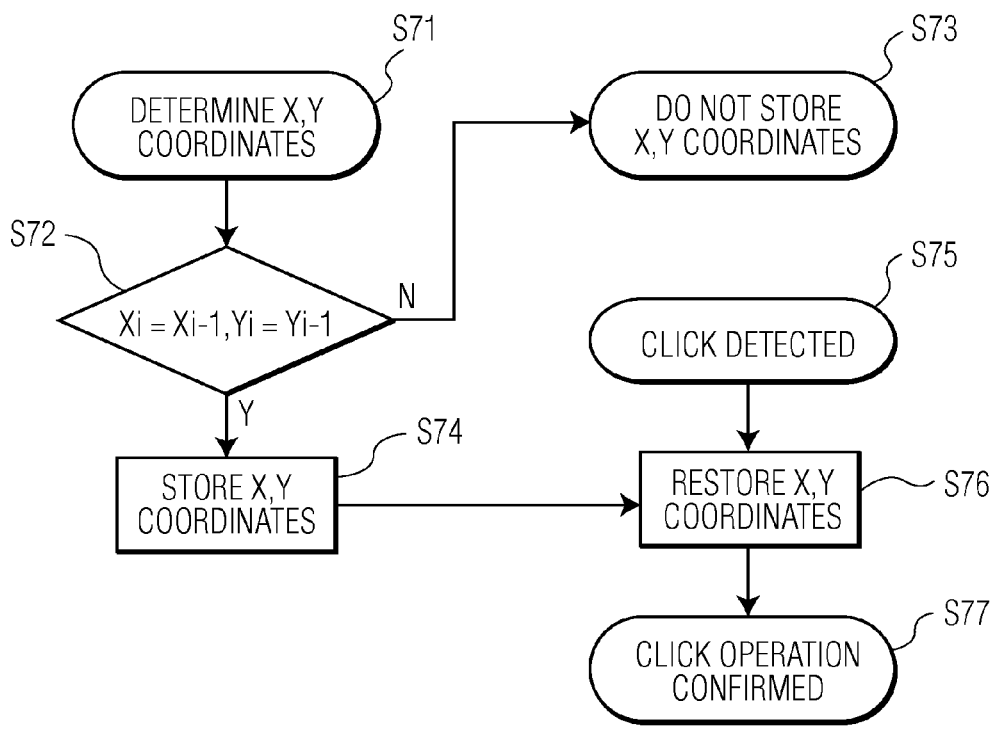
FIG. 7 shows an exemplary algorithm corresponding to a second embodiment of the present invention.

FIG. 7 shows an exemplary algorithm corresponding to a second embodiment of the present invention. According to the second embodiment the basic concept of the invention is implemented as follows. In order to perform a click-to-select operation the user always has to stop the cursor at the position of a target item and then perform the actual click operation. This position needs to remain unchanged during the entire click operation to ensure that the correct target item will be selected. According to the second embodiment of the invention, the cursor position (X and Y coordinates) is stored whenever the cursor is detected to stand still. A standing-still situation is defined as the situation in which the coordinates X and Y in a given iteration do not change compared to the coordinate values in a previous iteration, that is, when $X_i=X_{i-1}$ and $Y_i=Y_{i-1}$. The X and Y coordinates can be stored in registers or stored as variables in other conventional ways.

In a first step S71, the coordinates X and Y are determined for a given iteration. In a second step S72, the coordinates of the given iteration are compared to the coordinates of the previous iteration. In other words, in step S72 it is tested whether the following condition holds: $X_i=X_{i-1}$ and $Y_i=Y_{i-1}$. If this condition holds, then the coordinates X and Y are stored in step S74. Subsequently, after a moment of standing still, if a click signal is detected by the electronic circuit in step S75, first the cursor position is restored to the stored coordinates X and Y in step S76, and then the click operation is confirmed at the device output in step S77. As a result, at the host device wherein the detection system is deployed the click signal is known to happen at the standing-still position just before the click operation. The assumption is that the user means to select the target item at the stored position. After confirming the click operation in step S77 the system returns to normal operation. If the condition $X_i=X_{i-1}$ and $Y_i=Y_{i-1}$ does not hold, then the coordinates X and Y do not need to be updated, i.e. the coordinate values in the register do not need to be overwritten (shown as step S73).

The above-mentioned preferred embodiments illustrate rather than limit the invention, and the skilled person will be able to design many alternative embodiments without departing from the scope of the appended claims. In the claims, any reference sign placed between parentheses shall not be construed as limiting the claim. The word "comprise(s)" or "comprising" does not exclude the presence of elements or steps other than those listed in a claim. The word "a" or "an" preceding an element does not exclude the presence of a plurality of such elements. The invention may be implemented by means of hardware comprising several distinct elements and/or by means of a suitably programmed processor. In a device claim enumerating several means, several of these means may be embodied by one and the same item of hardware. The mere fact that certain measures are recited in mutually different dependent claims does not indicate that a combination of these measures cannot be used to advantage.

The invention claimed is:

1. Detection system for the detection of movements of a movable object, said system comprising:
   a light emitting device for emitting light,
   a reflecting unit being arranged in functional connection with said movable object and being adapted for reflecting the emitted light,
   a plurality of detectors for detecting the reflected light and outputting detection signals for determining a movement of said movable object,
   wherein said plurality of detectors includes a first subset of detectors for the detection of a tilt movement of said movable object in a first direction, and a second subset of detectors for the detection of a tilt movement of said movable object in a second direction, and the detection of the tilt movement of said movable object is performed based on a difference in an irradiance of the reflected light on the detectors within each subset of detectors, and
   wherein said movement of said movable object includes a linear movement in a third direction perpendicular to said first and said second directions, and said linear movement of said movable object in said third direction is detected based on a sum of all of the detection signals,
   wherein the system compensates for an unintentional tilt movement of said movable object in at least one of the first direction and the second direction when a linear movement in the third direction is detected, wherein the system compensates for the unintentional tilt movement of said movable object by:
      determining a norm of a differential signal vector, said differential signal vector being formed by the detected tilt movement of said movable object in the first direction and the detected tilt movement of said movable object in the second direction;
      calculating a derivative of said norm with respect to time;
      comparing said derivative with a predetermined threshold; and
      if said derivative exceeds the predetermined threshold, forcing said norm to zero such that a cursor position on a display is frozen, and if said derivative is not more than the predetermined threshold, leaving said norm unchanged,
   wherein the detection system determines the cursor position on said display in dependence of the detected tilt movement of said movable object in the first direction and the detected tilt movement of said movable object in the second direction,
      wherein coordinates of the cursor position are stored only when the coordinates of the cursor position of an iteration are identical to coordinates of the cursor position of a previous iteration,
      and wherein the unintentional tilt movement of said movable object is compensated by restoring the cursor position to the stored values when a linear movement in the third direction is detected.

2. Detection system according to claim 1, wherein said norm is determined iteratively, and
   wherein said derivative is defined as the norm of the differential signal vector at iteration i minus the norm of the differential signal vector at iteration i–n,
   i and n being integer numbers and i≥n, and the duration of the iterations being substantially constant.

3. Portable device comprising a detection system according to claim 1.

4. Portable device comprising said display and a detection system according to claim 1,
   wherein said portable device is arranged such that the detection system determines the cursor position on said display in dependence of the detected tilt movement of said movable object in the first direction and the detected tilt movement of said movable object in the second direction,
   wherein values of the cursor position are stored when the detected tilt movement of said movable object in the first direction and the detected tilt movement of said movable object in the second direction has ended,
   and wherein the unintentional tilt movement of said movable object is compensated by restoring the cursor position to the stored values when a linear movement in the third direction is detected.

5. Detection system according claim 1, wherein said detection signals of said plurality of detectors are communicated to a plurality of processing units for obtaining signals indicative of the movement of said movable object based on said variation of the irradiance on said plurality of detectors.

6. Detection system according to claim 5, wherein said processing units include differential circuits for detecting differences in said output signals of said plurality of detectors and which are adapted for outputting a differential signal indicative of said movement of the movable object.

7. Detection system according to claim 1, wherein said light emitting device and said plurality of detectors are integrated on a substrate.

8. Detection system according to claim 1, wherein said light emitting device is located at a center position between said plural detectors and said plural detectors are located symmetrically around said light emitting device.

9. Integrated circuit having implemented therein a detection system for detecting movements of a movable object according to claim 1.

10. Method for detecting movements of a movable object of a detection system, said method comprising the steps of:
   emitting light to a reflecting unit,
   reflecting said emitted light by said reflecting unit being arranged in functional connection with said movable object,
   detecting said reflected light by a plurality of detectors and outputting detection signals for determining a movement of said movable object by said plurality of detectors,
   detecting a tilt movement of said movable object in a first direction by a first subset of detectors of said plurality of detectors, and detecting a tilt movement of said movable object in a second direction by a second subset of detectors of said plurality of detectors, the detection of the tilt movement of said movable object being performed based on a difference in the irradiance of the reflected light on the detectors within each subset of detectors,
   said movement of said movable object including a linear movement in a third direction perpendicular to said first and said second directions, and said linear movement of said movable object in said third direction being detected based on a sum of all of the detection signals,
   and compensating for an unintentional tilt movement of said movable object in the first direction and/or in the second direction when a linear movement in the third direction is detected, wherein compensating for the unintentional tilt movement of said movable object in the first direction and/or in the second direction when the linear movement in the third direction is detected comprises:
      determining a norm of a differential signal vector, said differential signal vector being formed by the detected tilt movement of said movable object in the first direction and the detected tilt movement of said movable object in the second direction;
calculating a derivative of said norm with respect to time;
comparing said derivative with a predetermined threshold; and
if said derivative exceeds the predetermined threshold, forcing said norm to zero such that a cursor position on a display is frozen, and if said derivative is not more than the predetermined threshold, leaving said norm unchanged, wherein said method comprises determining the cursor position on said display in dependence of the detected tilt movement of said movable object in the first direction and the detected tilt movement of said movable object in the second direction, wherein coordinates of the cursor position are stored only when the coordinates of the cursor position of an iteration are identical to coordinates of the cursor position of a previous iteration, and wherein the unintentional tilt movement of said movable object is compensated by restoring the cursor position to the stored values when a linear movement in the third direction is detected.

11. The detection system of claim 1, wherein said derivative of said norm is of a first value when the changes in said norm of said differential signal vector are of a second value, wherein said derivative of said norm is of a third value when the changes in said norm of said differential signal vector are of a fourth value, wherein the first value is smaller than the third value, and wherein the second value is smaller than the fourth value.

12. The detection system of claim 11, wherein said third direction is the Z direction.

13. The detection system of claim 12, wherein said first and second directions comprise the X direction and the Y direction.

* * * * *